July 28, 1953  H. H. PICKRON  2,646,683
VACUUM AND PRESSURE INDICATOR
Filed Feb. 17, 1949
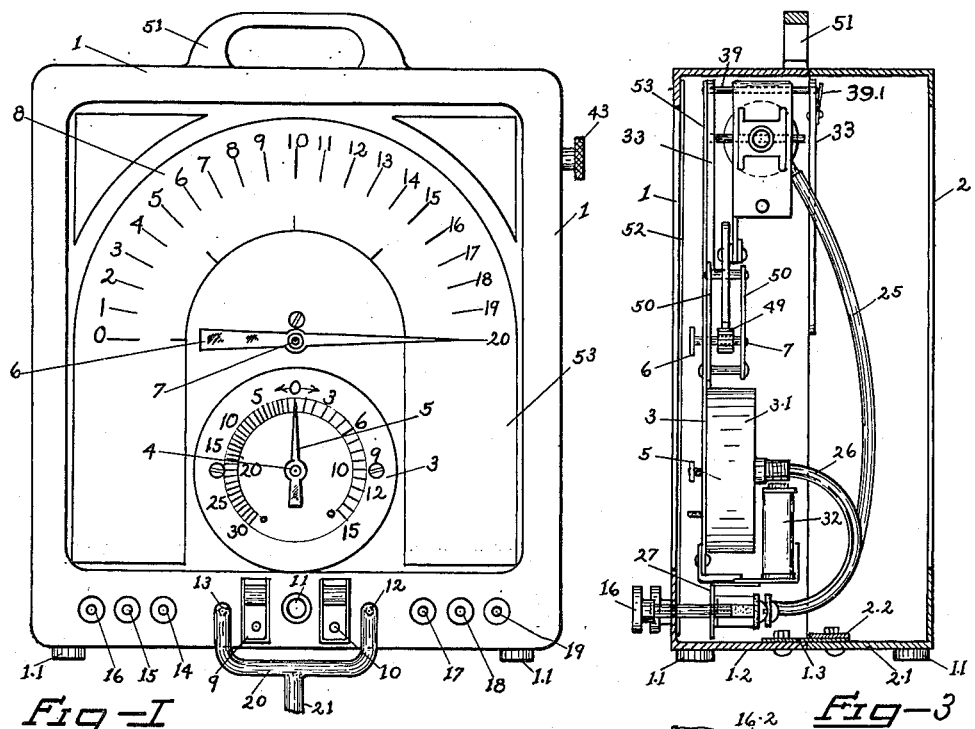
INVENTOR.
Hugo H. Pickron,
BY Bush & Bush.
His Attorneys.

Patented July 28, 1953

2,646,683

UNITED STATES PATENT OFFICE 2,646,683

VACUUM AND PRESSURE INDICATOR

Hugo H. Pickron, Rock Island, Ill.

Application February 17, 1949, Serial No. 76,909

13 Claims. (Cl. 73—389)

My invention relates to an improvement in vacuum and pressure indicators, and to the process of adjusting motors and other appliances to secure their highest efficiency by observing and utilizing fine variations in vacuum or fluid pressures as a guide for varying adjustments.

In various arts it has been common practice to use a vacuum gauge or a pressure gauge but heretofore no gauge has been produced which will give a large easily read deflection of the gauge pointer upon a slight variation of the vacuum or pressure.

When connected to the intake manifold of an automobile and the motor is running at idling speed, a given amount of vacuum should be produced and indicated. This vacuum is caused directly from the suction produced by piston travel. Efficiency of intake and exhaust valves, proper settings of carburetors, timers, fuel pumps, valves, automatic spark controls, rings, tappets, condensers and various component parts, are required to make a motor run at its best.

These component parts if not properly adjusted or not properly kept in repair and good working order interfere with the engine vacuum. Vacuum readings therefore are of great importance.

Ordinary gauges in common use are calibrated from 0–30" for vacuum over an arc of 180°.

The advantage of my invention is that you produce readings over 180° on the dial for a single inch of vacuum, or a complete half circle on a 10" dial, divided into 20 parts.

Therefore when making adjustments on component parts of an automobile motor the increase or decrease of vacuum height produced thereby is noticeable at a glance. The quick response and reaction are plainly visible, guiding the operator to make adjustments without difficulty and with utmost accuracy.

The difference between an ordinary vacuum gauge and my precision instrument is comparable to the difference between a steel rule with ⅛" graduations and a micrometer that measures thousandths.

In the bent tube type of gauge, which is most common form heretofore in use, while it is possible to indicate a variation of vacuum or pressure equal to one inch of mercury or one-half pound per square inch of air or fluid pressure, small fractions of an inch would not be observable nor readable upon the dial.

It is the principal object of my invention to provide means whereby very slight variations in vacuum or pressure will actuate a hand or pointer through an arc of from zero to one hundred eighty degrees on a relatively large dial thereby making plainly visible to the eye of the observer very slight variations, and to connect my apparatus to the intake of a motor or other appliance to be adjusted in such a way that each adjustment of parts which affects the height of the vacuum or pressure even in a slight degree will immediately affect my precision bellows and cause the hand or pointer to indicate on the precision dial the extent of that variation. Other objects will appear from the description.

I accomplish these objects by the means described and illustrated in the accompanying drawings in which:

Figure 1 is a front elevation of my apparatus;

Figure 2 is a rear elevation with the back cover removed and omitting the rear part of frame 33;

Figure 3 is a vertical section on the line 3—3 of Figure 2;

Figure 4 is a detail side elevation of one of the switches;

Figures 5 is a detail of the yoke connecting the bellows and tension spring on the line 5—5 of Figure 2;

Figure 6 shows an alternate form including light springs to aid the bellows.

My apparatus comprises a housing 1 with back cover 2, preferably rectangular and provided with rubber feet 1.1. A glass plate 52 covers the front of the apparatus and behind the glass plate a dial plate 53 is secured.

Mounted upon the dial plate is a vacuum gauge 3.1 of the bent tube type or which may be of any other common or well known type which will indicate large variations of an inch or more in the height of the vacuum or one-half pound of pressure with numerals 3 thereon to indicate such variations running from zero to thirty inches of vacuum or zero to fifteen pounds' pressure in an arc of ninety degrees. Its use is primarily to give a vacuum or pressure reading.

My dial plate also carries a precision dial 8 with numerals from zero to twenty or more through an arc of one hundred eighty degrees. Within the housing I mount a sensitive bellows which may be of metal, rubber or cloth as desired, but I prefer to utilize a tubular metal bellows 22.

This bellows is mounted in the upper part of the housing with one end secured at a fixed distance from the end of the housing by an end plate 34.1 of the frame 33 and the other end has a drawbar 35 rigidly united thereto. This drawbar 35 passes through an aperture in a lever 38 having its upper end pivotally united to the frame by a pivot 39, and its lower end engaging an actuating lever 47 which carries a rack 48 arranged to mesh with a pinion 49 mounted upon the pivot 7 that carries the hand or pointer 6 of the precision dial.

The other end of the drawbar 35 is attached to a yoke 37 attached to one end of a helical tension spring 36. The other end of the spring is united to the inner end of a threaded rod 42 mounted in the housing as hereafter described and projecting outwardly through the adjacent end of the housing with a threaded sleeve in mesh with threads on the rod by which the rod may be retracted and the spring tension increased or it may be advanced and the spring tension diminished. A knurled knob 43 may be united to the sleeve.

The sensitive-bellows drawbar, lever, rod and spring are supported by corresponding front and rear frame members 33 united to flanged end plates 34.1 and mounted in the upper part of the housing. The frame acts as a guard for the front and rear of the bellows. Plates 23—24 are mounted upon the bellows support extending along the upper and lower sides of the bellows as additional guards.

A spring plate 39.1 may be mounted upon the frame to retain the pivot 39 of the lever 38 against displacement.

An adjustable stop rod 54 is mounted in and threaded through the housing to act as a detent for the lever 38 to stop the movement of the drawbar and bellows in one direction and the lever 38 will act upon the yoke 37 as a stop to limit the movement of the drawbar in the opposite direction. This stop rod has slidably mounted thereon the bracket 55.

An adjustable stop bar 56 is mounted upon the bellows frame with one end in position to contact and act as a detent for the bracket 55.

A small flat spring 38.1 is mounted upon the lever 38 to contact the inner end of the stop rod 54 and cushion its contact with the lever.

The lower end of the lever 38 is provided with a slot 44 in which one end of a link 45 is pivotally secured. The other end of the link 45 is pivoted in a slot 46 formed in the upper end of the rack lever 47.

The rack lever is pivotally mounted between small end plates 47.1 upon the back of the dial plate 53. Its lower end is widened and a rack 48 formed thereon to mesh with a pinion 49 mounted upon the pivot 7 of the precision hand or pointer 6.

The parts described are so arranged that a slight increase in the vacuum will contract the bellows, thereby moving the drawbar, rack lever and pinion so as to actuate the hand or pointer 6 to indicate each slight increase of vacuum.

In the case of pressure meters, each increase of pressure will cause the bellows to expand correspondingly and the lever 38 will be moved in the opposite direction, thereby causing the precision pointer to indicate each slight increase or decrease of pressure.

In order to actuate the bellows, separate tubes 12 and 13 are mounted in the lower part of the housing with their inner ends connected respectively to the bent tube meter and to the bellows by rubber or other tubing 26 and 25. The outer ends 20 of these tubes are connected in parallel to a tube 21 leading to the intake manifold of an automobile or to any vacuum line of the motor or other appliance to be tested.

After being so connected, the motor is started and the vacuum produced in the intake line will cause the hand on the vacuum meter to move to a point on the dial corresponding to the amount or height of the vacuum produced in the intake line.

With the motor running, the knurled knob is then turned to adjust the tension of the spring 36 so that it is equal to the pull of the bellows 22 upon the drawbar 35 with the lever 38 in a position to cause the hand on the precision dial to stand at zero.

The bellows is constructed with sufficient sensitivity so that a variation of one inch in the vacuum will cause the lever 38 to move far enough to carry the hand on the precision dial from zero to twenty or in other words to the opposite end of a one hundred eighty degree arc.

In case the vacuum increases to such an extent that the precision hand moves its maximum distance and can go no farther, the tension on the screw 36 is readjusted to bring the bellows again into balance with the hand returned to the zero end of the scale.

It is well known that an automobile engine gives its best performance and is most efficient when the maximum vacuum for which it is designed is produced in the intake, and when there is any impairment of efficiency due to improper mixture of air and fuel, improper adjustment of the carburetor, fouling of spark plugs or maladjustment thereof, leakage of valves or conduits, impairment of the spark coil or maladjustment of the timer, or fouling of the timer points, or various other conditions which impair normal efficiency, the vacuum will be reduced; and that when proper adjustments are made to correct such defects, the vacuum will be restored to its normal height.

It has been found by actual use that upon connecting my appliance to the intake manifold of a motor as described, adjustments which correct one or more of the defects described above will immediately increase the vacuum as shown by my precision dial and a very slight change in the adjustments whether to correct or increase a defect will be readily perceptible to an operator who observes the precision dial and he can therefore judge what adjustments produce the best results, and the necessary extent of them.

Thus he is able to change the adjustments in the various parts in either direction until he has found the adjustment which produces the highest vacuum and the most efficient performance.

In order to test the adjustment of the electrical appliances of an automobile or other machine, I mount a ground bar 27 in my housing which can be connected to the ground of an automobile.

On the ground bar but insulated therefrom I mount switches 14 to 19 with leads therefrom extending to a series of fixed condensers preferably of the oil container type.

These condensers are preferably of one half micro-farad capacity each and are installed in oil containers 30, 31 and 32. Each container holds two separate condensers. The condensers are arranged in parallel and each switch is arranged to cut in or cut out one of the condensers so that any number of the condensers from one to six can be cut in or out.

When connected in parallel with the condenser or spark coil of an automobile, the capacity may be increased from one-half micro-farad up to three micro-farads as desired, which is sufficient for ordinary purposes. If upon cutting in the first of my condensers, the firing of the automobile is improved as indicated by an increase of vacuum, it shows that the automobile condenser is not up to par and a new one may be needed.

In testing the ignition coil of an automobile, the precision hand should be set at 10 with the engine running at the desired speed. The condensers are then cut in one at a time beginning with the one on the left.

A perfect ignition coil will stand an increase of three micro-farads without causing the precision hand to oscillate. If it will only stand the addition of one condenser without oscillating or wavering, it shows that the efficiency of the coil is low—not over 20%. The efficiency of the coil is directly proportionate to the amount of capacity which can be added by cutting in successive condensers without causing the precision hand to oscillate.

Likewise one or more of the condensers may be cut in to the distributor circuit or to the spark plug circuit and it may be thereby determined whether a given adjustment or correction improves the efficiency of the engine as shown by an increase of vacuum. To observe the variations in the electric currents a small lamp 11 with resistance 29 is mounted on the ground bar with a switch 16 to cut it in or out.

When the engine misses fire from a defective spark plug, it will cause the pointer to jump, and by shorting the plugs successively it can be determined which one is causing the miss.

My apparatus may also be used to ascertain clogging of a radiator. When used for this purpose the apparatus is placed at a level above the top of the radiator and the inlet tube connected to the pet cock of the radiator.

When the engine is started, the water pump draws water from the lower part of the radiator. If the radiator is clear and acting properly, the flow will be steady and unimpaired. But if the radiator is clogged so that the water does not circulate through it freely, the pump will put a pull on the lower part of the radiator fluid thus causing a partial vacuum in the intake tube leading to the vacuum meter and bellows. Thus the condition and efficiency of a radiator can be determined without tearing it down.

Terminals 9 and 10 are united upon the ground bar 27 one of which is insulated therefrom and in circuit with the switches, by which connections may be made with the ground and the electric circuit of an automobile or other machine to be tested.

In such matters as the administration of gas or other anesthetic or the administration of oxygen to a patient where a controlled pressure is vital or important, my apparatus may be used to indicate plainly to the operator whether the desired pressure is being maintained.

The use of my invention in adjusting automobile engines is as follows:

A tubular connection is made between the intake manifold of an automobile and the gauge 3. The engine is then started and the reading of the gauge observed. When the engine has run long enough to develop its maximum vacuum at a given speed, a tubular connection is made from the intake or the tube leading therefrom to the sensitive bellows 22. The bellows is then manually adjusted to a position whereby the needle of the precision gauge will stand at zero. The operator then proceeds to adjust the particular portion of the automobile mechanism the action of which it is desired to regulate meanwhile observing the indicator of the precision gauge and continuing the adjusting movements so long as the precision gauge continues to indicate an increase in height of the vacuum. In case the precision pointer reaches the end of its available travel, the spring and bellows are readjusted to return the precision pointer to zero and the operation continued until the highest obtainable vacuum has been attained.

For various particular parts the following practice is favored.

*Carburetor.*—Connect hose to vacuum line of motor and to double fitting on analyzer. Run motor at idling speed, if pointer is unruly increase speed of motor slightly. Regulate upper knob so as to bring large pointer to zero. Now, adjust carburetor so as to obtain highest reading on precision scale. If efficiency gain exceeds 20 on this scale, return pointer to zero with regulating knob. Continue with carburetor adjustment until peak setting is reached.

*Timing.*—Return pointer to zero, set timing to maximum reading on precision scale. If pointer fluctuates at this setting, then retard timing three points on scale.

*Valves.*—Faulty valve operation is indicated by sharp dips of large pointer. Disconnecting or cutting out the correct spark plug will locate the faulty valve.

*Setting tappets.*—With motor running at idling speed set tappets using a feeler gauge and note variation on scale.

*Automatic spark advance.*—Disconnect vacuum line from timer bellows. Attach single end of hose at right of analyzer. Connect T fitting with double end of hose, one to bellows the other to bellows vacuum line. Start motor. Set speed at approximately 17" of vacuum. Then remove short hose from bellows line. This will reduce speed automatically to idling. Now kink this hose and apply same again. Then gradually release kink allowing vacuum to build up. At approximately 5" of vacuum motor will pick up speed, and increase to full advanced position at approximately 12 to 14" of vacuum, or to manufacturer's specifications. If this action is not obtained, check vacuum line, bellows and spring tension of bellows.

*Plugs.*—Spark plugs firing intermittently are indicated by slight dips of large pointer.

*To detect leaky rings.*—Inject a small amount of oil into cylinders and note the difference in precision scale readings.

*Manifold.*—Manifold or heat riser leakage is indicated by failure to obtain highest normal vacuum reading through carburetor adjustment. Vacuum reading will be very low, gas consumption very high.

*Cylinder condition.*—Set precision hand at 20, then check each cylinder by shorting out plugs in rotation. All cylinders should have the same drop in vacuum. If any cylinder drops more than the average, check valves, tappets, rings and dual carburetion.

*Booster pump.*—Connect hose to booster pump line. Idle motor. Adjust regulator knob to bring large pointer to 20. Shut off motor. If precision scale reading remains at 20, no leakage exists. If hand returns to zero, there is a leakage.

In the claims I use the term "coarse vacuum meter" to describe a vacuum meter having a dial hand which will indicate variations of approximately one inch in vacuum height or one-half pound in pressure over an arc of ninety degrees but which will not register variations of a small fraction of an inch of vacuum or half pound pressure clearly enough to be readily visible, and "precision meter" or "precision dial" to denote a vacuum or pressure meter or dial capable of indicating small fractions say from 1/100 to 1/20 of an inch of vacuum height or 1/200 to 1/40 of a pound of air pressure. A common form of coarse vacuum meter is the bent or curved tube type which is well known but I do not exclude other forms which may give equivalent performance.

In Figure 6 I have shown an alternate form in which the bellows 22 are assisted by light tension springs 57 mounted upon cross bars 58 and 59. The cross bar 58 is united to the fixed end of the bellows by the set screw 60 which also secures the right end of the bellows in fixed position.

The cross bar 59 is united to the drawbar 5 and the movable end of the bellows so as to move therewith.

The tension springs 57 are preferably helical springs of light wire and will assist the bellows in retracting the drawbar 5 upon a very slight variation in the amount of the vacuum. By this means the bellows are made more sensitive and will retract the drawbar upon variations in vacuum from zero to two or three inches thus making the precision pointer indicate accurately variations through low ranges which could not otherwise be detected.

Many other uses may be developed for my invention. The form and arrangement of parts may be varied to a large extent without departing from the spirit of my invention and I do not limit my claims to the precise forms shown in the drawings and description.

I claim:

1. In a vacuum indicator of the class described, a housing, coarse and precision dials mounted thereon, a stiff Bourdon tube vacuum meter mounted therein having an intake arranged for connection with the intake manifold of an automobile, a sensitive bellows mounted in the housing with intake for connection with the intake manifold in parallel with the intake of the coarse vacuum meter, indicator hands or pointers pivotally mounted upon said meters adjacent said dials respectively, a drawbar having one end united to the movable end of the bellows, and the other end attached to the inner end of a tension spring the outer end of which is carried by a rod threaded in a manually rotatable sleeve mounted in the housing whereby the spring can be tightened or relaxed by manually turning the sleeve and the bellows expanded or contracted, a lever having its upper end pivoted to the housing and its lower end having one end of a link pivoted thereto the other end of which link is pivoted to one end of a rack lever pivoted upon the precision dial plate, a rack formed on the lower end of said rack lever arranged to mesh with and actuate a pinion mounted on a shaft journaled in the precision dial plate and carrying a pointer, whereby the pointer will be moved proportionately to the movement of the bellows by variations in the degree of vacuum too slight to actuate the coarse meter sufficiently to be clearly observable on its dial.

2. In a vacuum indicator of the class described, a housing having mounted therein a coarse vacuum meter with dial and pointer and an intake arranged for connection with the intake manifold or other partial vacuum container of an automobile or other apparatus, a precision meter including a dial plate and pointer and a sensitive bellows with one end rigidly united to the housing and having an intake in parallel with the intake of the coarse vacuum meter, a drawbar having one end united to the movable end of the bellows and its other end attached to the inner end of a tension spring the outer end of which is carried by a rod threaded in a manually rotatable sleeve mounted in the housing whereby the spring can be tightened or loosened by manually turning the rod and the pull of the spring adjusted to just equal or balance the pull of a given vacuum upon the bellows and drawbar, a lever having its upper end pivoted to the housing with a central aperture through which the drawbar passes, and its lower end having one end of a link pivoted thereto the other end of which link is pivoted to one end of a rack lever pivoted upon the precision dial plate, a rack formed on the lower end of said rack lever arranged to mesh with and actuate a pinion mounted on a shaft journaled in the dial plate and carrying the precision pointer, whereby the pointer will be moved proportionately to the movement of the bellows with each slight variation in the degree of vacuum.

3. In a vacuum indicator as described in claim 2, the coarse dial having a scale with spaces and numerals thereon to indicate variations of vacuum equal to inches of mercury from 0 to 15 over an arc of 90°, and the precision dial having spaces and numerals thereon to indicate variations of small fractions of inches of vacuum from 0 to 20 over an arc of 180°.

4. In a vacuum indicator as described in claim 2, the coarse dial having spaces and numerals thereon to indicate variations of vacuum equal to inches of mercury only from 0 to 15 and the precision dial having spaces and numerals from 0 to 20 over an arc of 180° thereon to indicate variations of vacuum equal to very small decimal fractions of an inch of mercury.

5. A fluid pressure indicator having a housing, a coarse pressure meter mounted therein with dial and pointer arranged to indicate large variations in pressure in pounds and having an intake arranged to connect with a line carrying fluid under pressure, a sensitive precision meter mounted in the housing, including a dial plate and pointer arranged to indicate very small variations of pressure in the fluid line and having an intake in parallel with the intake of the coarse meter and a sensitive bellows with one end united to the housing and the free end united to a drawbar having its other end attached to the inner end of a helical spring the outer end of which is carried by a rod threaded in a manually rotatable sleeve revolvably mounted in the housing whereby the spring can be tightened or loosened by manually turning the sleeve so that the action of the spring upon the bellows will just equal or balance the pressure within the bellows and intake.

6. A fluid pressure indicator as described in claim 7, a lever having its upper end pivoted to the housing and its lower end having one end of a link pivoted thereto the other end of which link is pivoted to one end of a rack lever pivoted upon the precision dial plate, a rack formed on the lower end of said rack lever arranged to mesh with and actuate a pinion mounted on a shaft journaled in the dial plate and carrying the precision pointer, whereby the pointer will be moved proportionately to the movement of the bellows with each slight variation in the degree of pressure.

7. A testing apparatus for automobiles, including a housing, a coarse dial mounted thereon with spaces and numerals to indicate variations in pressure of pounds or multiples thereof and variations in degrees of vacuum in inches of mercury, a coarse meter having a hand or pointer pivotally arranged to travel along the coarse dial progressively as the pressure or vacuum is increased, an intake for connection with the apparatus to be tested, a precision meter having a hand or pointer arranged to travel along a precision dial mounted upon the housing and with spaces and numerals arranged to indicate changes in degrees of vacuum in small decimal fractions of an inch of mercury or variations in small fractions of a pound whereby the effect of various adjustments of an automobile or other engine may be observed, an intake in parallel with the intake of the coarse meter, the precision meter including a sensitive bellows having one end united to the housing and its other end coupled by a drawbar to a tension spring adjustably mounted in the housing, and means whereby the tension of the spring may be increased or diminished to balance the tension or pressure upon the drawbar produced by the bellows when actuated by the vacuum or pressure of air in the intake with the hand standing at zero on the precision dial.

8. A testing appliance for vacuum producing apparatus, including a Bourdon tube vacuum and pressure meter mounted thereon with a hand or pointer pivotally arranged to travel along a coarse dial or scale progressively as the vacuum is increased or diminished with numerals and spaces arranged to indicate variations of vacuum in inches and variations of pressure in pounds, a sensitive bellows meter mounted in the housing and having a hand or pointer arranged to travel upon a dial having spaces and numerals arranged to indicate small fractions of inches of mercury or of pressure in small fractions of a pound, a drawbar united to the movable member of the bellows and arranged to actuate a rack lever, a pinion mounted upon the pivot of the hand or pointer in mesh with the rack of the rack lever whereby the hand will be actuated simultaneously with the movements of the drawbar in either direction, and means to set the hand of the bellows meter at zero while the hand of the Bourdon meter stands at any of the various positions on the coarse dial, both meters being connected to a common source of vacuum in a vacuum producing apparatus.

9. A testing appliance as described in claim 8, the free end of the drawbar being coupled to a helical spring the outer end of which is carried by a rod threaded in a manually rotatable sleeve mounted in the housing whereby the spring can be tightened or loosened by manually turning the sleeve and the bellows expanded or contracted so that the spring will balance a given vacuum or pressure in the bellows.

10. A testing appliance as described in claim 8, the free end of the drawbar being coupled to a helical spring the outer end of which is carried by a rod threaded in a manually rotatable sleeve mounted in the housing whereby the spring can be tightened or loosened by manually turning the sleeve and the bellows expanded or contracted so that the spring will balance a given vacuum or pressure in the bellows, and parallel crossbars united to the end plates of the bellows with light tension springs mounted upon the crossbars tending to draw them toward each other and to coact with the vacuum in contracting the bellows whereby the sensitivity of the bellows may be increased.

11. In apparatus for testing and observing variations in pressure or in vacuum in fluid conduits of engines or other apparatus while adjustments are being made therein, the combination with a housing, a coarse dial mounted thereon with spaces and numerals to indicate variations in pressure of pounds or multiples thereof and variations in degrees of vacuum in inches of mercury, a Bourdon tube meter having a hand or pointer pivotally arranged to travel along the coarse dial progressively as the pressure or vacuum is increased, an intake for connection with the apparatus to be tested, a sensitive bellows precision meter having a hand or pointer arranged to travel along a precision dial mounted upon the housing and with spaces and numerals arranged to indicate changes in degrees of vacuum in small decimal fractions of an inch of mercury or variations in small fractions of a pound whereby the effect of various adjustments of an automobile or other engines may be observed, an intake in parallel with the intake of the coarse meter, the precision meter including a sensitive bellows having one end united to the housing and its other end coupled by a drawbar to a tension spring adjustably mounted in the housing, and a threaded rod united to the free end of the spring in mesh with an internally threaded sleeve rotatably mounted in the housing whereby the tension of the spring upon the drawbar may be varied by rotation of the sleeve, and parallel crossbars united to the end plates of the bellows with light tension springs mounted upon the crossbars tending to draw them toward each other and to coact with the vacuum in contracting the bellows whereby the sensitivity of the bellows may be increased.

12. A testing apparatus for automobiles, including a housing, a coarse dial mounted thereon with spaces and numerals to indicate variations in pressure of pounds or multiples thereof and variations in degrees of vacuum in inches of mercury, a coarse meter having a hand or pointer pivotally arranged to travel along the coarse dial progressively as the pressure or vacuum is increased, an intake for connection with the apparatus to be tested, a precision meter having a hand or pointer arranged to travel along a precision dial mounted upon the housing and with spaces and numerals arranged to indicate changes in degrees of vacuum in small decimal fractions of an inch of mercury or variations in small fractions of a pound whereby the effect of various adjustments of an automobile or other engine may be observed, an intake in parallel with the intake of the coarse meter, and means whereby the precision meter may be adjusted to cause its hand or pointer to stand at zero while the hand of the coarse meter stands at any of the numerals or spaces of the coarse dial, the precision meter including a sensitive bellows having one end united to the housing and its other end coupled by a drawbar to a tension spring adjustably mounted in the housing, and a threaded rod united to the free end of the spring in mesh with an internally threaded sleeve rotatably mounted in the housing whereby the tension of the spring upon the drawbar may be varied by rotation of the sleeve.

13. A testing apparatus for automobiles, including a housing, a coarse dial mounted thereon with spaces and numerals to indicate variations in pressure of pounds or multiples thereof and variations in degrees of vacuum in inches of mercury, a coarse meter having a hand or pointer pivotally arranged to travel along the coarse dial progressively as the pressure or vacuum is increased, an intake for connection with the apparatus to be tested, a precision meter having a hand or pointer arranged to travel along a precision dial mounted upon the housing and with spaces and numerals arranged to indicate changes in degrees of vacuum in small decimal fractions of an inch of mercury or variations in small fractions of a pound whereby the effect of various adjustments of an automobile or other engine may be observed, an intake in parallel with the intake of the coarse meter, the precision meter including a sensitive bellows having one end united to the housing and its other end coupled by a drawbar to a tension spring adjustably mounted in the housing, and means whereby the tension of the spring may be increased or diminished to balance the tension or pressure upon the drawbar produced by the bellows when actuated by the vacuum or pressure of air in the intake with the hand standing at zero on the precision dial.

HUGO H. PICKRON.

References Cited in the file of this patent

UNITED STATES PATENTS

| Number | Name | Date |
|---|---|---|
| Re. 21,482 | Martin | June 11, 1940 |
| 805,720 | Fulton | Nov. 28, 1905 |
| 1,064,555 | Simmance et al. | June 10, 1913 |
| 1,201,140 | Bode | Oct. 10, 1916 |
| 1,339,989 | Thompson | May 11, 1920 |
| 1,723,548 | Heise | Aug. 6, 1929 |
| 1,956,004 | Carson | Apr. 24, 1934 |
| 2,284,588 | Rineer | May 26, 1942 |
| 2,437,371 | Allen | Mar. 9, 1948 |
| 2,502,776 | Burdick | Apr. 4, 1950 |

FOREIGN PATENTS

| Number | Country | Date |
|---|---|---|
| 518,488 | Great Britain | Feb. 28, 1940 |
| 553,211 | Great Britain | May 12, 1943 |